May 3, 1955  C. W. FISCHER  2,707,352
PRESERVATION OF PLANTS AND PLANT PARTS
Filed Oct. 25, 1950
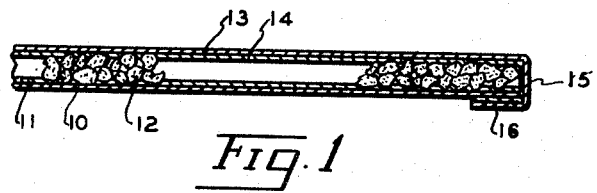
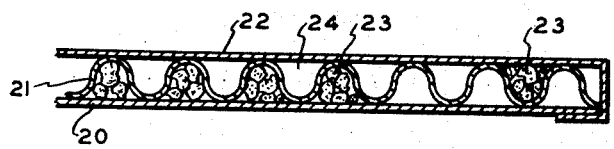
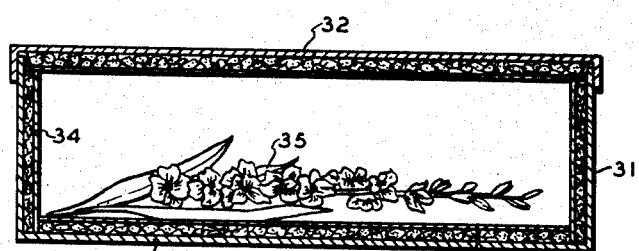
INVENTOR
CHARLES W. FISCHER
BY *Stowell & Evans*
ATTORNEYS

United States Patent Office 2,707,352
Patented May 3, 1955

2,707,352
PRESERVATION OF PLANTS AND PLANT PARTS

Charles W. Fischer, Ithaca, N. Y., assignor to Research Corporation, New York, N. Y., a corporation of New York Application October 25, 1950, Serial No. 192,068

1 Claim. (Cl. 47—58)

This invention relates to the preservation of plants and plant parts against fungus decay or mold deterioration that normally occurs more or less rapidly during storage and shipment of such vegetable items. The invention relates more particularly to a method for storing cut flowers and the like and to containers and wrappers for storing and shipping plant parts.

An object of the invention is to provide a method and device for substantially increasing the storage life of plants and plant parts whereby the freshness of the latter is retained for extended periods of time.

Another object is to enable cut flowers and other vegetable life to be shipped for long distances without substantial deterioration.

Another object is to minimize fungus decay of cut flowers, fruits and edible vegetables. The invention is valuable in preventing fruits, particularly berries, and vegetables, particularly tomatoes, from acquiring storage rot and decay in transit.

Still another object is to provide containers and wrappers for plants and plant parts that protect the latter from mould deterioration. Such devices are economical to make and use and the use thereof results in the saving of valuable shipments of cut flowers and other vegetable items.

These and other aims, objects and advantages as may appear hereinafter are achieved in a method for preserving plants and plant parts subject to mould deterioration which includes placing said plants and plant parts in a substantially closed container in association with a solid adsorbent material impregnated with bromine.

The preferred solid adsorbent material is activated charcoal, particularly the hard, granulated form thereof such as is made from coconut shells and having discrete granules ranging up to one-eighth of an inch in longest dimension. The granules of activated charcoal, when enclosed in a container with bromine, adsorb relatively large quantities of bromine to form granules of brominated activated charcoal. The brominated activated charcoal contains about 20% by weight of bromine and provides a palpably dry material that slowly evaporates bromine into the atmosphere at temperatures and pressures normally encountered in storage and shipment of cut flowers.

Other solid adsorbent substances such as silica gel, talc, diatomaceous earth and even shredded paper may be employed as the bromine carrier in the practice of the present invention.

Plants and plant parts are protected in accordance with the invention by enclosing them in wrappers or containers including a layer of a solid adsorbent substance impregnated with bromine. The bromine is believed to be evaporated from the carrier substance into the atmosphere and to condense upon the cut flowers or the like in the wrapper or container. The bromine acts as a fungicide or fungistat substantially eliminating mould and fungus growth on the flowers and attendant plant decay.

The wrappers and containers of the invention may take a wide variety of forms some of which are shown by way of illustration in the accompanying drawing, in which:

Fig. 1 is a cross-sectional view of a composite wrapping sheet suitable for use in preserving flowers, vegetables and the like;

Fig. 2 is a cross-sectional view of another form of composite wrapping sheet; and Fig. 3 is a cross-sectional view of a box embodying the invention.

Referring to the drawing, particularly to Fig. 1, the composite wrapping structure shown has a bottom sheet 10 of kraft or similar paper. A layer or film 11 of adhesive composition, such as rubber cement or any other non-aqueous binding material, is spread on the upper surface of the paper sheet 10 and a layer 12 of granules of brominated activated charcoal is laid uniformly on the adhesive coated lower sheet of paper. The granules are thus cemented to the lower sheet. An upper sheet 13 of kraft paper having a coating 14 of adhesive composition on its under side is laid upon the layer of charcoal granules and becomes cemented thereto when the adhesive sets. The margins of the composite sheet may be sealed as by providing an overlapping edge 15 for the top sheet and turning this edge under the bottom sheet and sticking it thereto at 16.

In use, cut flowers such as orchids are wrapped in the sheet of Fig. 1. Preferably the wrapped flowers are then placed in a closed box, but this is not essential. Bromine evaporates from the charcoal at ordinary storage temperatures, passes through the pores of the adhesive layers and the paper and condenses on the cut flowers to protect them from fungus decay.

Kraft paper is typical of the flexible sheet material that may be used in fabricating the composite wrapper of the invention. However, materials of greater or lesser permeability or porosity may be substituted. For example, cloth may take the place of one or both of the kraft paper sheets in the wrapper of Fig. 1. Also, one of the sheets, preferably the one forming the outer skin of the wrapper may be essentially impermeable to bromine vapors; materials such as metal foil may thus be employed. Plastic sheet material may also be used in the practice of the invention; regenerated cellulose, commonly known as cellophane, and sheets of synthetic resinous composition can be employed to support or contain the brominated activated charcoal. Moreover, the composite wrapper need not include two sheets of flexible sheet material where a single sheet is sufficient to support the solid adsorbent impregnated with bromine.

In the wrapper of Fig. 1, the layers of adhesive composition are shown as being continuous on both the upper and lower paper sheets. However, the adhesive may be applied in isolated spots at random or regularly over the area of the paper to increase the over-all permeability of the envelope. Other means of securing the envelope may be employed; for example, staples may be used to unite the upper and lower sheet members to retain the adsorbent material sandwiched therebetween.

Referring to Fig. 2, a modified form of composite wrapper embodying the principles of the invention is shown. It has a lower flat paper sheet member 20, an intermediate corrugated paper sheet member 21 and an upper flat paper sheet member 22 assembled in the illustrated relation and bonded to form a unitary board by application of suitable adhesive to the joints of the structure. Brominated activated charcoal granules 23 are included in the pockets 24 formed by the corrugated and flat sheets; the granules preferably being placed in the pockets during fabrication of the structure. Adhesive composition may be and preferably is employed to lock the granules to the sheet members, although, if the pockets are sealed by end closure webs, adhesive is not required to effect a bond between the granules and the paper.

The weight of paper used for the elements 20, 21 and 22 of the structure of Fig. 2 and the character and amount of adhesive employed may be varied to form a structure that is sufficiently flexible to provide a readily bendable wrapper or sufficiently rigid to provide a board for the making of shipping boxes and the like. The outer sheet of the composite board may be substantially impervious to bromine vapors.

The composite structure of Fig. 2 is employed similarly to the structure of Fig. 1 and functions in a similar manner to provide protection for cut flowers and the like.

Referring to Fig. 3, the box shown is conventional in appearance from the outside and has the usual bottom 30, sides 31 and removable cover 32 formed of corrugated paper board, wood, metal or other convenient material of construction. The interior of the box, in accordance with the invention, is lined with a layer or layers 33 of granules of brominated activated charcoal protected and held in place by sheets 34 of kraft paper or the like. The granules may be cemented to the sides of the outer box and the kraft paper may be secured to the layers of granules by means of adhesive composition.

In use, cut flowers 35 are placed in the box and the top is positioned to close the box. Vapors of bromine emanating from the brominated activated charcoal seep through the paper liner and condense on the flowers, thereby preserving them for extended periods of time.

Although the invention has been described by way of illustration with reference to the preservation of cut flowers, such as orchids, other cut flowers, especially carnations, chrysanthemums and gladioli, that are very susceptible to fungus attack are well preserved in the wrappers and containers of the invention. The invention is also applicable to the preservation of fruits, particularly strawberries, and tomatoes, and to vegetables that are prone to fungus decay.

From the foregoing, it will be apparent that the present invention may be practiced in many ways suggested by the disclosure, and not particularly shown and described herein, without departing from the spirit of the invention.

I claim:

A method for increasing the storage life of cut flowers that are prone to fungus decay which comprises placing the cut flowers in a substantially closed container along with a solid absorbent material impregnated with bromine, whereby the freshness of the cut flowers is retained for extended periods of time.

References Cited in the file of this patent

UNITED STATES PATENTS

| | | |
|---|---|---|
| 1,092,059 | Lafore | Mar. 31, 1914 |
| 1,909,013 | Ruzicka | May 16, 1933 |
| 2,222,815 | Johnson | Nov. 26, 1940 |
| 2,377,446 | Payne | June 5, 1945 |
| 2,416,734 | Boggs et al. | Mar. 4, 1947 |
| 2,427,647 | Vahlteich | Sept. 16, 1947 |
| 2,572,669 | Sarge | Oct. 23, 1951 |
| 2,593,146 | Howard | Apr. 15, 1952 |

FOREIGN PATENTS

| | | |
|---|---|---|
| 24,022 | Australia | of 1935 |
| 537,047 | Germany | Oct. 28, 1931 |
| 349,561 | Great Britain | May 21, 1931 |

OTHER REFERENCES

Chemical Abstracts, vol. 7, p. 1893 (1913).
Chemical Abstracts, vol. 33, col. 7487 (1939).
Chemical Abstracts, vol. 35, col. 6854 (1941).
Chemical Abstracts, vol. 44, cols. 6921, 6922 (1950).
Southwick, J. Agr. Research, vol. 71, No. 7, pp. 297–314 (Oct. 1, 1945).
Fischer et al., Proc. Am. Soc. Hort. Sci., vol. 57, published June 1951, pp. 432–438.